(12) United States Patent
Sawdon et al.

(10) Patent No.: US 6,200,059 B1
(45) Date of Patent: Mar. 13, 2001

(54) TOOL ADJUSTMENT SYSTEM

(75) Inventors: Edwin G. Sawdon, St. Clair; Dean J. Kruger, Jeddo, both of MI (US)

(73) Assignee: BTM Corporation, Marysville, MI (US)

( * ) Notice: Subject to any disclaimer, the term of this patent is extended or adjusted under 35 U.S.C. 154(b) by 0 days.

(21) Appl. No.: 08/916,757

(22) Filed: Aug. 19, 1997

(51) Int. Cl.$^7$ ........................................ F16B 2/18
(52) U.S. Cl. .................... 403/13; 403/408.1; 403/409.1; 403/DIG. 8
(58) Field of Search ............................. 403/409.1, 408.1, 403/11, 12, 13, 14, DIG. 8, 257, 350, 351, 352; 294/86.4, 106, 902

(56) References Cited

U.S. PATENT DOCUMENTS

| | | | |
|---|---|---|---|
| 1,806,694 | * 5/1931 | Markson | 403/DIG. 8 X |
| 2,216,208 | * 10/1940 | Michon | 403/DIG. 8 X |
| 2,371,835 | * 3/1945 | McNamara, Jr. | 403/DIG. 8 X |
| 3,892,147 | 7/1975 | Flaig . | |
| 4,124,258 | * 11/1978 | Hafner | 403/350 X |
| 4,159,093 | * 6/1979 | Hamilton | 403/350 X |
| 4,266,591 | * 5/1981 | F'Geppert | 403/408.1 X |
| 4,309,123 | 1/1982 | Moore . | |
| 4,360,282 | 11/1982 | Koch . | |
| 4,997,303 | * 3/1991 | Xu et al. | 403/409.1 X |
| 5,024,585 | 6/1991 | Kralovec . | |
| 5,118,088 | 6/1992 | Sawdon . | |
| 5,141,357 | 8/1992 | Sherman et al. . | |
| 5,171,001 | 12/1992 | Sawdon . | |
| 5,487,215 | 1/1996 | Ladouceur . | |
| 5,681,127 | * 10/1997 | Willen | 403/409.1 X |
| 5,857,915 | * 1/1999 | Leith | 403/350 X |

FOREIGN PATENT DOCUMENTS

| | | | |
|---|---|---|---|
| 2315625 | * 1/1977 | (FR) | 403/297 |
| 2108622 | * 5/1983 | (GB) | 403/408.1 |

OTHER PUBLICATIONS

Tool Engineers Handbook, "Locating Methods", "Jigs and Fixtures", First Edition, 1949, pp. 1543–1546, 1574.
Machinery's Handbook, "Cleve Pins", "Dowel Pins", "Cap Screws", "Shoulder Screws", 20th Edition, 1976, by Erik Oberg, Franklin D. Jones, Holbrook L. Horton, pp. 1142–1145, 1224–1225.
Unbrako, "Dowel Pins" Dimensions, Application Data, prior to Aug. 19, 1997, pp. 54–55.
Torrington, "Eccentric Studs", prior to Aug. 19, 1997, p. 120.

* cited by examiner

*Primary Examiner*—Harry C. Kim
(74) *Attorney, Agent, or Firm*—Harness, Dickey & Pierce, P.L.C.

(57) ABSTRACT

A tool adjustment system includes a first body, a second body and an adjusting member. The adjusting member is rotatably affixed to the first body and allowed to rotate in the second body during angular adjustment of the first body relative to the second body. In yet another aspect of the present invention, an adjustment tool and a locking tool are provided.

19 Claims, 6 Drawing Sheets

TOOL ADJUSTMENT SYSTEM

BACKGROUND AND SUMMARY OF THE INVENTION

This invention relates generally to an adjustment system and more particularly to a member for adjusting a tool relative to a mounting body.

Powered grippers, clamps and gauges (collectively referenced herein as a gripper or tool) are typically secured to a floor mounted bracket, table, robotic arm or other mounting body by common dowel pins, roll pins or bolts. Conventional dowel pins have a circular-cylindrical exterior shape, a chamfered first end, a rounded second end and are entirely solid. These dowel pins, roll pins and bolts serve to positively locate and fasten the gripper to the adjacent bracket in a positive and precise manner in the X, Y and Z directional axes. In one traditional arrangement, a pair of solid dowel pins are pressfit into a bracket and powered gripper, with the dowel pins being diagonally located relative to each other. In this device, a pair of mounting screws are also diagonally located relative to each other for securing the powered gripper to the mounting bracket. However, the dowel pins and screws are positioned to define a square pattern. The dowel pins and screws do not allow for angular realignment between the gripper and bracket.

Notwithstanding, it is common for the workpiece to be mislocated by as much as 15 angular minutes prior to being clamped by the gripper; this mislocation can be significant for a large part, such as a sheet metal automotive vehicle body panel. This can lead to subsequent gripping misalignment and undesired process variations. The conventional manner for readjusting the gripper to account for part misalignment is to insert multiple shims or wedges to angularly move the bracket along the X (vertical) and Y (horizontal in-out) planes. Thus, gripper to bracket setup and maintenance are often time-consuming, expensive and relatively crude.

In accordance with the present invention, a preferred embodiment of a tool adjustment system includes a first body, a second body and adjustable locating member. The member is rotatably affixed to the first body and allowed to rotate in the second body during angular adjustment of the bodies relative to each other. In another aspect of the present invention, a pin longitudinally projects in an offset manner from a generally smooth intermediate section of a rotatable adjustment member. In still another aspect of the present invention, a plug is inserted into the rotatable adjustment member so as to expand and deter further rotation of the rotatable adjustment member and a tool body relative to a mounting member. In yet another aspect of the present invention, an adjustment tool and a locking tool serve to rotate the rotatable adjustment member in order to adjust the tool body relative to the mounting member and then subsequently maintain the desired adjustment position while locking the rotatable adjustment member to the mounting member.

The adjustable tool mounting system of the present invention is advantageous over conventional devices in that the present invention provides a very refined and precise rotational adjustment of a gripper body relative to a bracket. This accurate adjustment construction allows for quick and precisely maintained positioning of the gripper body, thereby saving the associated setup and maintenance costs while improving repeatable part gripping and subsequent processing. The present invention also allows for use of a rotatable adjustment assembly as a retro-fit kit in existing tool setups.

Additional advantages and features of the present invention will become apparent from the following description and appended claims, taken in conjunction with the accompanying drawings.

BRIEF DESCRIPTION OF THE DRAWINGS

FIG. 10 is a partially fragmented side elevational view showing a first alternate embodiment of the tool adjustment system;

DETAILED DESCRIPTION OF THE PREFERRED EMBODIMENT

Figure 1:
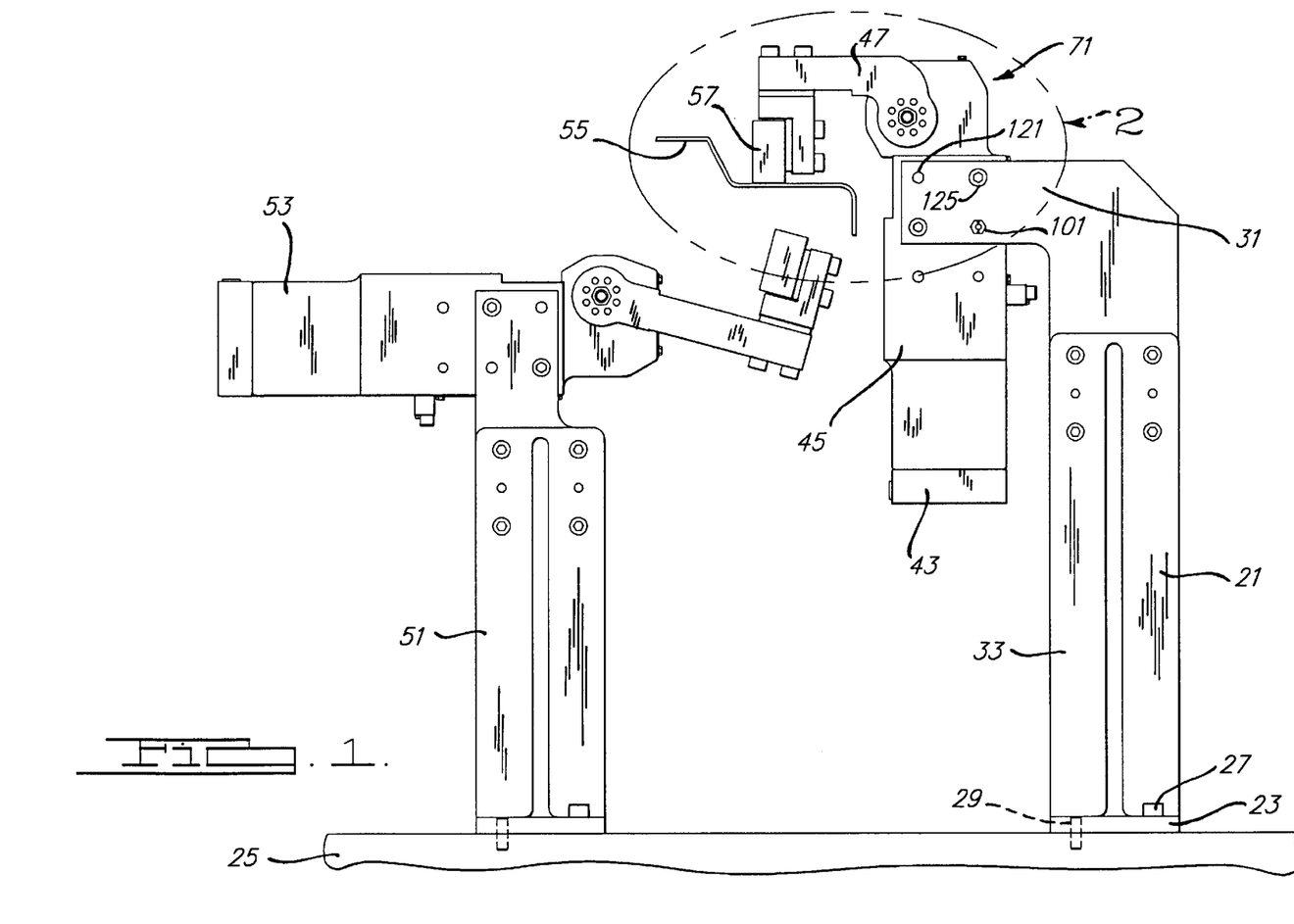
FIG. 1 is a side elevational view showing the preferred embodiment of a tool adjustment system of the present invention relative to a workpiece.
Figure 2:
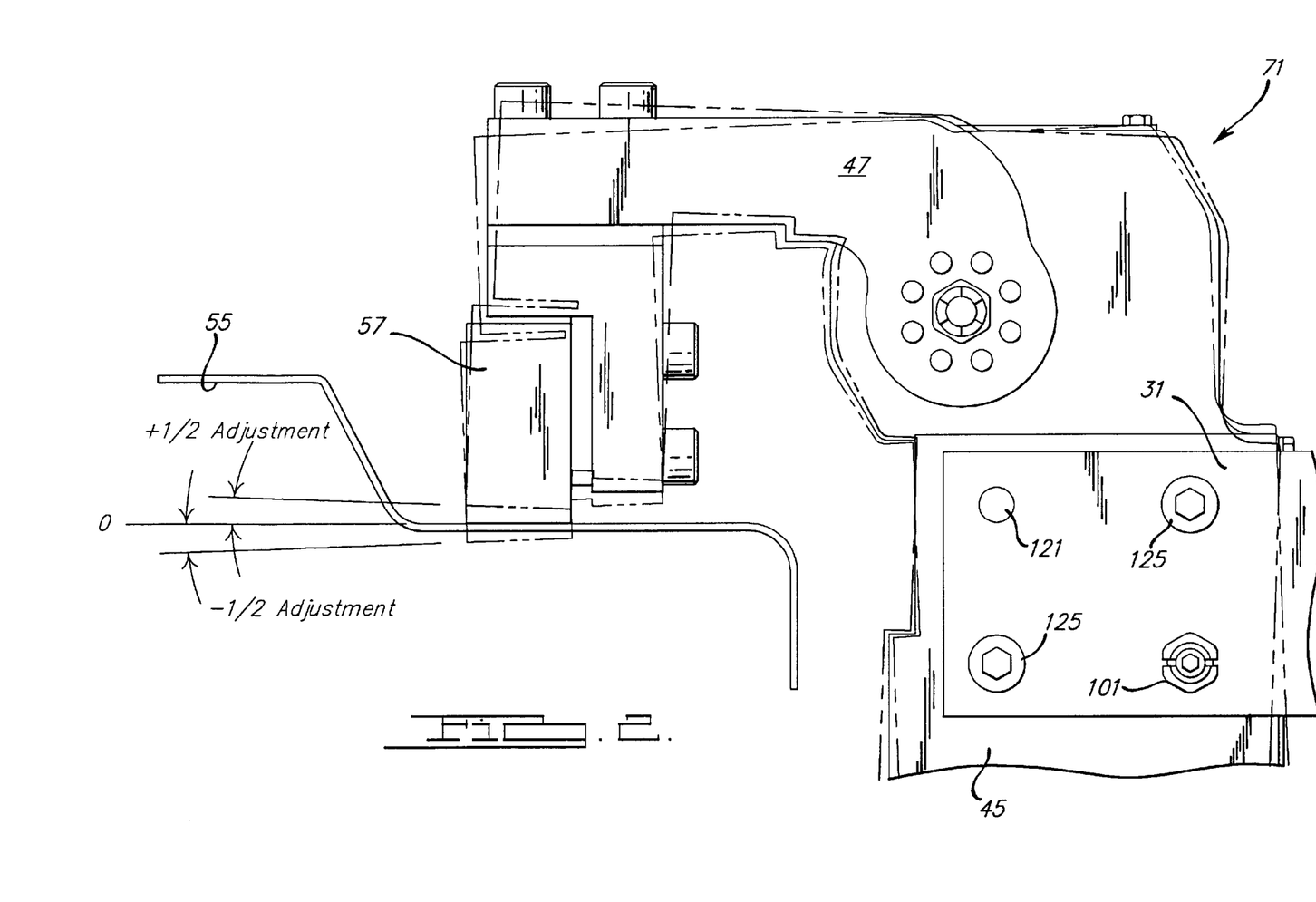
FIG. 2 is an enlarged side elevational view, taken within circle 2 of FIG. 1, showing the preferred embodiment of the tool adjustment system.
Figure 3:
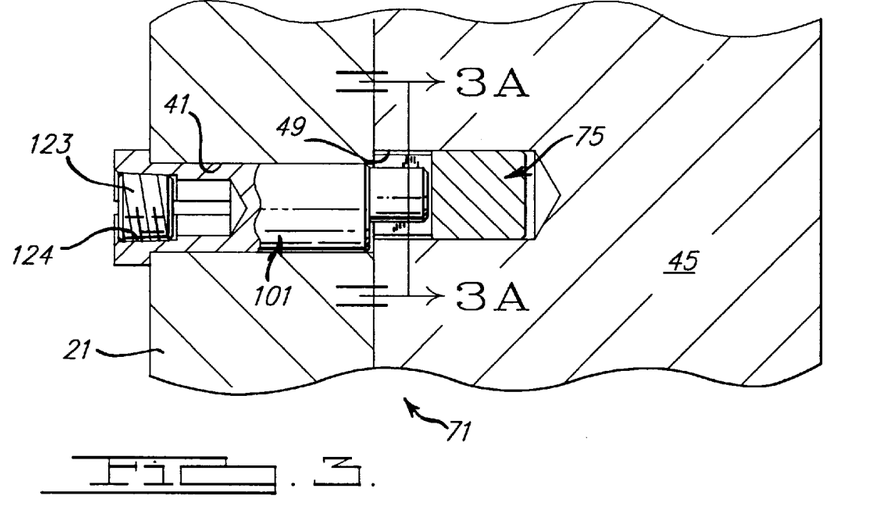
FIG. 3 is a cross sectional view, taken along line 3—3 of FIG. 2, showing the preferred embodiment of the tool adjustment system.

Referring to FIGS. 1–3, a first body or bracket 21 has a base 23 secured to a floor or table 25 by a couple of bolts 27 and a couple of locating dowel pins 29. An angled blade 31 projects from an upstanding riser 33 of bracket 21. Four through bores 41 are drilled in blade 31 and are arranged in a square pattern relative to each other.

A gripper tool 43 has an aluminum body 45 containing a pneumatic or hydraulic fluid powered piston which travels in a linear direction. An externally mounted gripping or back up arm 47 is adjustably mounted for rotation to a hub. Within body 45, hub is rotatably coupled to a crank which, in turn, is coupled to a linearly moving slide by a straight link. Four holes 49 are drilled into body 45 corresponding to through bores 41. Gripper 43 is preferably a TRILOK™ gripper sold by BTM Corporation employing an internally moving three point, crank-to-slide block stop. It is also envisioned that any other gripper, or tool can be employed in combination with the present invention. For example, the preferred gripper may be substituted by the devices shown in the following U.S. patents which have been invented by one of the inventors of the present invention: U.S. Pat. No. 5,516,173 entitled "Gripper" which issued on May 14, 1996; U.S. Pat. No. 5,171,001 entitled "Sealed Power Clamp" which issued on Dec. 15, 1992; and U.S. Pat. No. 5,118,088 entitled "Power Clamp" which issued on Jun. 2, 1992; all of which are incorporated by reference herein. A second bracket 51 and second powered gripper 53 are also used to grip a workpiece 55, such as a piece of sheet metal, against a gripping pad 57 secured to arm 47 of the first gripper 43.

The preferred embodiment of an adjustable tool mounting system 71, is used to adjust then fasten gripper body 45 to bracket 21. This can be observed in FIGS. 3–6. An adjustable dowel assembly 73 employs an insert 75 machined from 4150 heat treated steel rod stock, having a black oxide coating, and a partially circular-cylindrical exterior surface 77. The exterior surface at a body end 79 of insert 75 has a straight knurl or splined pattern oriented in a parallel and longitudinal direction. A pair of partially circular cross sectionally shaped legs 81 longitudinally project from body end 79 and are separated by a rectangularly shaped slot defined by a pair of flat internal surfaces 83. Insert 75 is pressfit into one hole 49 in gripper body 45 and is prevented from rotation by engagement of the straight knurl pattern with the surface of body 45 defining hole 49.

Insert 75 is ideally suited for retrofit use in existing circular-cylindrical holes commonly employed in gripper bodies, that do not allow for angular adjustment relative to a corresponding mounting bracket. Accordingly, flat surfaces 83 of legs 81 act as interlocking structures for engaging an adjustable dowel, as will be discussed in further detail hereinafter. Notwithstanding, it should be appreciated that other interlocking structures may be employed which are integrally formed as part of the gripper body such that a separate insert is not necessarily required.

Referring now to FIGS. 3, 3A, 4 and 7–9, the adjustable dowel 101 has a head 103, a body portion or an intermediate segment 105, and an adjusting portion or a pin 107. Head 103 has a hexagonally shaped periphery defined by multiple flats for receiving a hand-held adjustable wrench. Intermediate segment 105 has an unthreaded, circular-cylindrical and smooth exterior surface which is longitudinally elongated. An expansion slot 109 is machined through a portion of intermediate segment 105 and head 103. Pin 107 also has an unthreaded and smooth, circular-cylindrical exterior surface. A centerline of pin 107 is eccentrically or transversely offset from intermediate segment 105. Thus, a transverse width of pin 107 is less than a transverse width of intermediate segment 105. Adjustable dowel 101 is preferably machined from 4150 heat treated steel rod stock having a black oxide coating and a Rockwell hardness of 28–32 C.

Pin 107 of adjustable dowel 101 is longitudinally insertable through bore 41 of bracket 21 and into hole 49 of gripper body 45 such that its circular-cylindrical external surface fits between legs 81 of insert 75. Concurrently, intermediate segment 105 of adjustable dowel 101 is inserted and allowed to freely rotate within bore 41 of bracket 21. Thus, when a wrench engages and rotates head 103 of adjustable dowel 101, intermediate segment 105 will rotate within bracket 21 and eccentric pin 107 will abut against and be prevented from rotating relative to flat surfaces 83 of insert 75. This will cause gripper body 45 to pivot about a fixed pivot dowel 121 (see FIGS. 1 and 2), which has a solid circular-cylindrical body with rounded or chamfered ends. Plus or minus 0.5 degrees of rotational adjustment will provide the equivalent amount of angular adjustment of gripping pad 57 (see FIG. 1) depending on the specific geometry of the parts employed.

Figures 3A, 4:
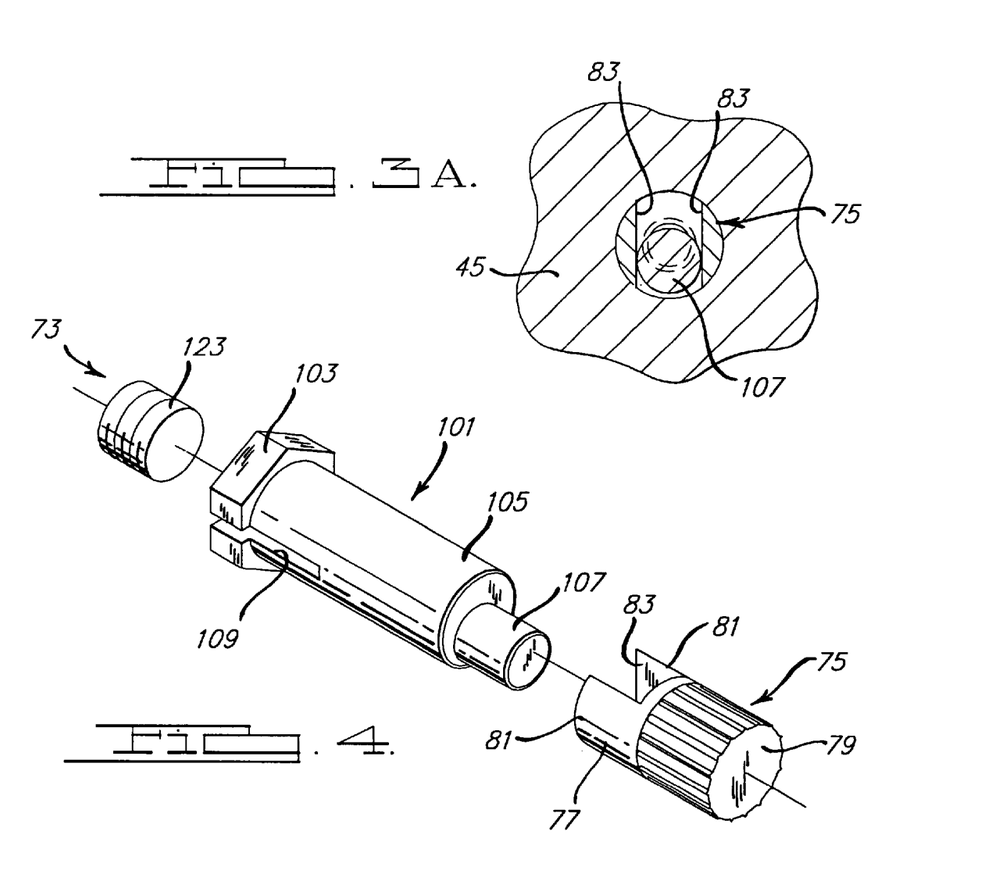
FIG. 3A is a cross sectional view, taken along line 3A—3A, showing the interface between an adjustable dowel and an insert employed in the preferred embodiment of the tool adjustment system.
FIG. 4 is an exploded perspective view showing the adjustable dowel, insert and a plug employed in the preferred embodiment of the tool adjustment system.
Figure 5:
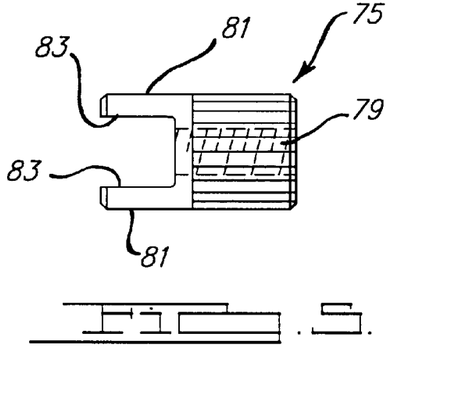
FIG. 5 is a side elevational view showing the insert employed in the preferred embodiment of the tool adjustment system.
Figure 6:
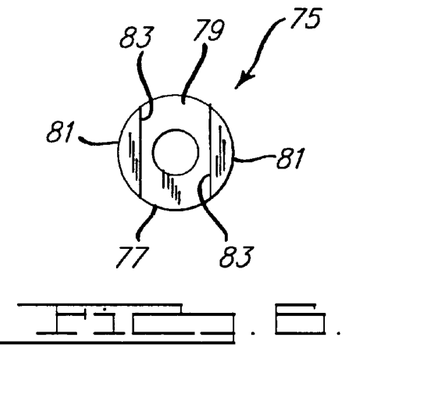
FIG. 6 is an end elevational view showing the insert employed in the preferred embodiment of the tool adjustment system.
Figures 7, 8, 9:
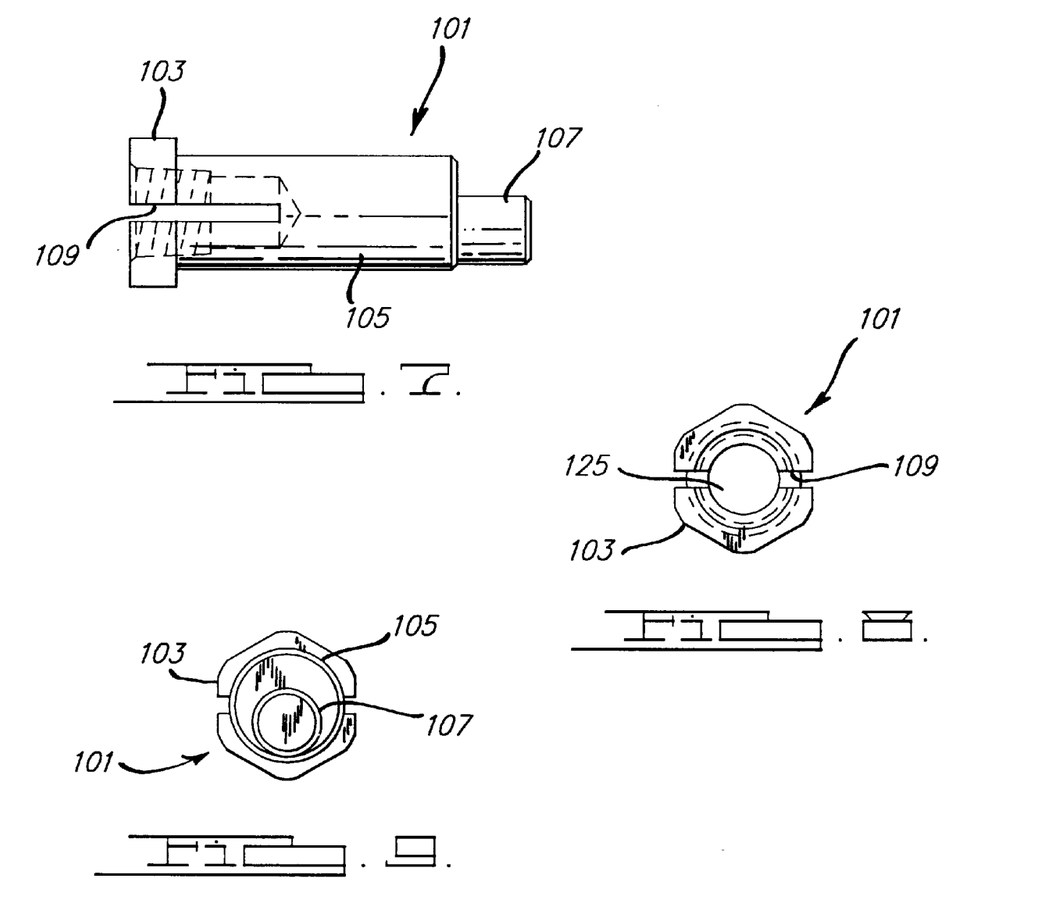
FIG. 7 is a side elevational view showing the adjustable dowel employed in the preferred embodiment of the tool adjustment system.
FIG. 8 is an end elevational view showing the adjustable dowel employed in the preferred embodiment of the tool adjustment system.
FIG. 9 is an end elevational view, taken opposite that of FIG. 8, showing the adjustable dowel employed in the preferred embodiment of the tool adjustment system.

Next, as is illustrated in FIGS. 3 and 4, an externally threaded and tapered steel plug 124 is inserted into a corresponding internally threaded cavity 124 of adjustable dowel 101. This causes a portion of adjustable dowel 101, adjacent to expansion slot 109, to transversely expand away from its longitudinal centerline, thereby securely fastening and preventing adjustable dowel 101 from further rotation relative to bracket 21. Plug 123 has a blind hexagonal hole for receiving an Allen wrench but may also be provided with a slot or Phillips head pattern for engagement by a screwdriver. The wrench must continue to engage and prevent head 103 of adjustable dowel 101 from rotating while plug 123 is being fully inserted, so as to maintain gripper body 45 in its final desired adjusted position.

A pair of mounting screws or bolts 125 (see FIGS. 1 and 2) are then screwed into their corresponding smooth bracket bores and internally threaded gripper body holes to longitudinally secure gripper body 45 to bracket 21. However, between approximately 0.8 and 1 millimeter of transverse clearance is provided between each screw 125 and the corresponding bracket bore to allow for the rotational adjustment provided by adjustment dowel 101.

Figures 11, 12:
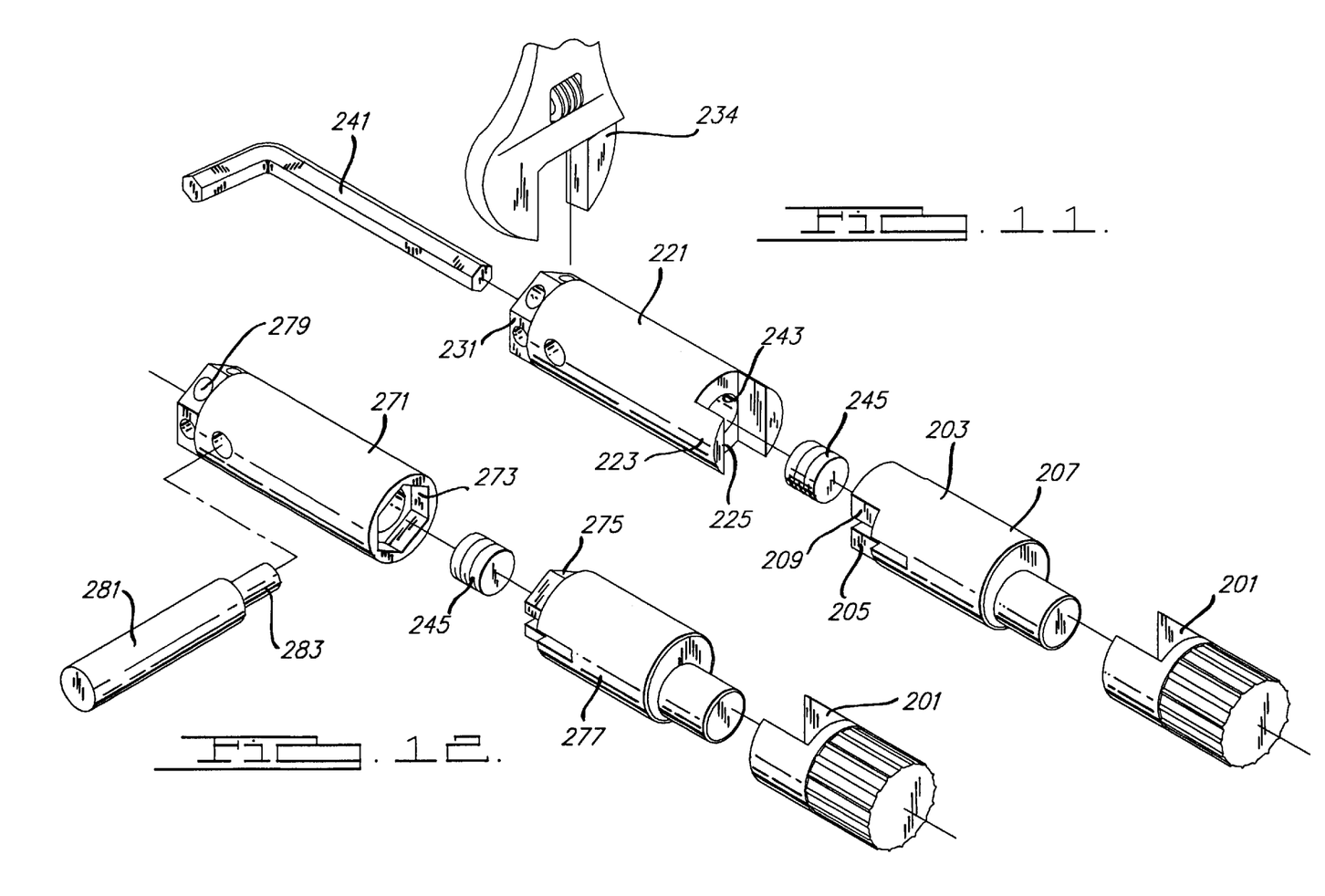
FIG. 11 is an exploded perspective view showing the first alternate embodiment of the tool adjustment system.
FIG. 12 is an exploded perspective view showing a second alternate embodiment of the tool adjustment system.
Figure 12:
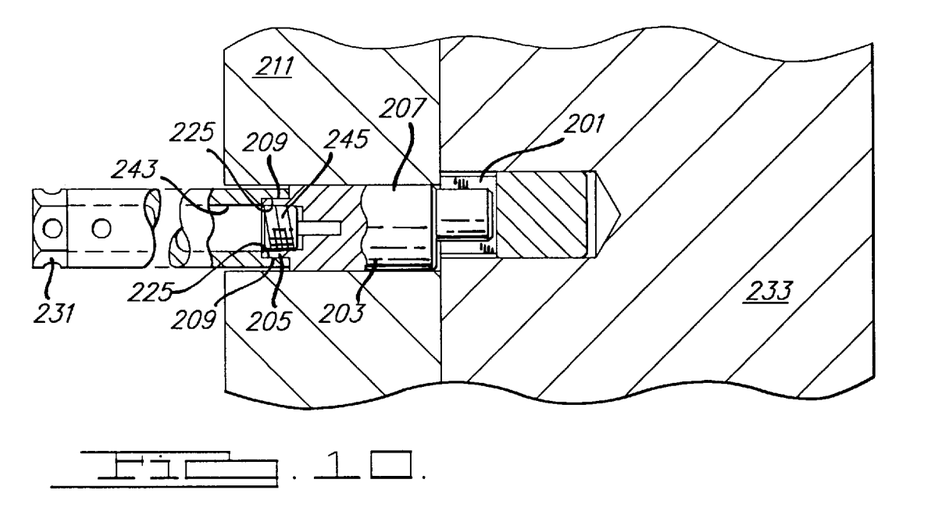

A first alternate embodiment adjustable tool mounting system of the present invention is shown in FIGS. 10 and 11. An insert 201 and adjustable dowel 203 are generally the same as that described with the preferred embodiment except that in the present embodiment, a tool receiving head 205 has a width less than that of an intermediate section 207. Furthermore, head 205 has a pair of external flat surfaces 209. Thus, adjustable dowel 203 can be entirely hidden within a bracket 211 if the thickness of bracket 211 is larger than the longitudinal length of adjustable dowel 203.

In this arrangement, a special steel adjustment tool 221 is used to rotate adjustable dowel 203. An engaging end 223 of adjustment tool 221 has a pair of internal flats 225 separated by a generally rectangular transverse slot for receiving head 205. Adjustment tool 221 is further provided with a wrench receiving end 231, defined by a hexagonal periphery. A wrench 234 engages end 231 of adjustment tool 221 for rotating adjustable dowel 203 relative to bracket 211. After a gripper 233 has been angularly oriented to its desired position relative to bracket 211, wrench 234 maintains adjustment tool 221 and adjustable dowel 203 in its final position while an Allen wrench 241 is longitudinally inserted into an internal and cylindrical shaft 243 running through adjustment tool 221. This allows Allen wrench 241 to engage the blind hexagonal hole of a plug 245. Thus, Allen wrench 241 is allowed to rotate plug 245 in order to expand the intermediate section of adjustable dowel 203 without causing concurrent rotation of adjustable dowel 203 or gripper 233. Alternately, a screwdriver can be used in place of Allen wrench 241.

FIG. 12 illustrates a second alternate embodiment of the present invention wherein a special adjustment tool 271 has an internal, blind hexagonal configuration 273 for engaging a corresponding external, hexagonal pattern 275 on an adjustable dowel 277. Furthermore, the opposite end of adjustment tool 271 is provided with a set of transversely extending holes 279 for receiving a steel rod 281. Rod 281 has stepped, circular-cylindrical external surfaces which are coaxially aligned. The smaller portion 283 of rod 281 is engagable into holes 279 and used to manually rotate adjustment tool 271 and adjustable dowel 277.

Figure 13:
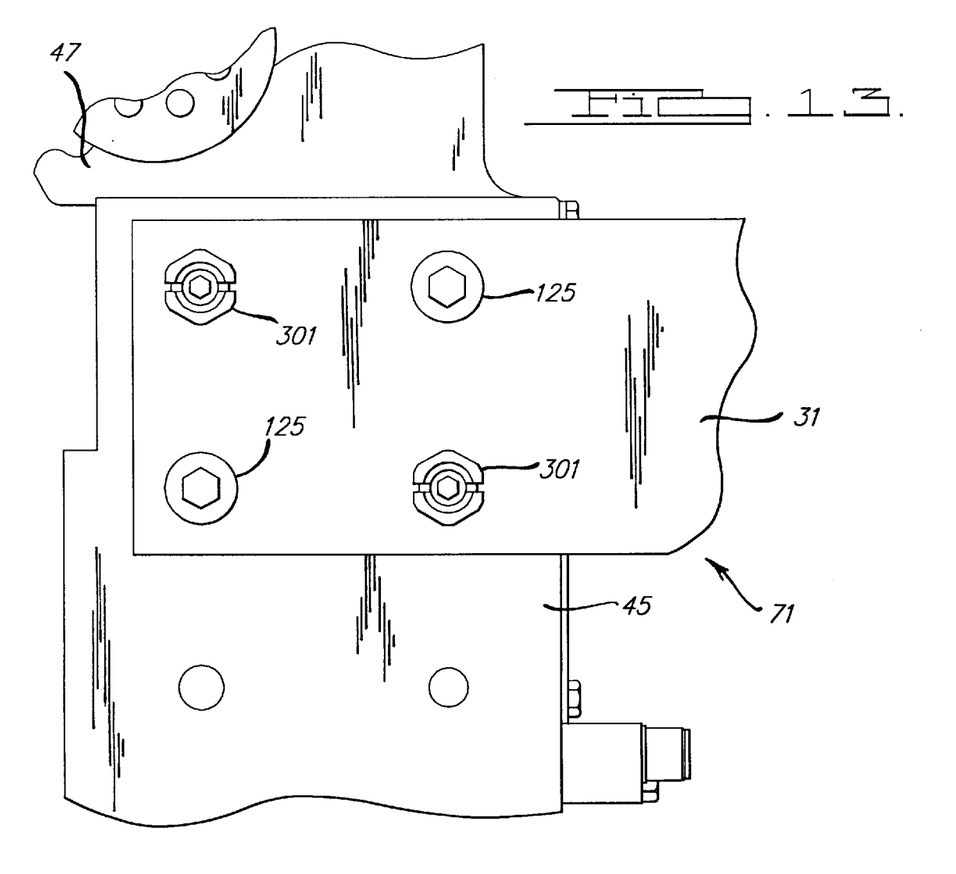
FIG. 13 is a side elevational view, similar to that of FIG. 2, showing a third alternate embodiment of the tool adjustment system.

Finally, referring to FIG. 13, two adjustable dowels 301 (and no pivot dowels) are employed to provide full circular rotational adjustment of the gripper relative to the mounting bracket. Hence, the theoretical gripper pivot point is located between the two adjustable dowels 301. In this situation, the adjustable dowels are essentially identical to each other.

While various embodiments of the tool adjustment system have been described and illustrated, it will be appreciated that many other variations can be used without departing from the scope of the present invention. For example, an impacted wedge can be used in place of the disclosed plug. Furthermore, the interlocking structure may include a keyhole-shaped gripper hole or other internally formed gripper body projections. Moreover, the pin of the adjustable dowel may have other shapes. Various materials have been disclosed in an exemplary fashion, however, other materials may of course be employed. It is intended by the following claims to cover these and any other departures from the disclosed embodiments which fall within the true spirit of this invention.

The invention claimed is:

1. An adjustment system comprising:

a tool having a hole;

a body having a through-bore; and an adjustable locating member comprising an adjusting portion disposed in said hole and a body portion, said adjusting portion revolving eccentrically relative to a center axis of said body portion, and an actuating portion disposed on said body portion; and a pivot dowel engaging said tool and said body, rotation of said adjustable member operably causing said tool to pivot about said pivot dowel;

whereby actuation of said actuating portion causes said body portion to rotate relative to said adjusting portion thereby moving said tool with respect to said body.

2. The system of claim 1 further comprising a fluid powered piston disposed in said tool and a gripping arm pivoting relative to said tool in response to movement of said piston.

3. The system of claim 1 further comprising an adjustment tool having a first portion for engaging an adjustment tool receiving end of said adjustable member, said adjustment tool further having a second portion for allowing access to a second tool for expanding said body portion of said adjustable member, whereby said body portion of said adjustable member is transversely expanded without simultaneously rotating said adjustable member, thereby securing said adjustable member to said body and securing said tool in a desired adjustment position.

4. An adjustment system comprising:

a first body having a hole;

a second body having a through-bore; and an adjustable locating member including an adjusting portion located in said hole and a body portion, said adjusting portion revolving eccentrically relative to a center axis of said body portion, and an actuating portion located on said body portion;

wherein said body portion of said adjustable member is transversely expandable to deter rotation of said first body relative to said second body, whereby actuation of said actuating portion causes said body portion to rotate relative to said adjusting portion thereby moving said first and second bodies with respect to one another.

5. The system of claim 4 further comprising a plug disposed in said body portion to cause expansion.

6. The system of claim 4 wherein said body portion is circular-cylindrical and said adjusting portion is circular-cylindrical, said portions having different widths.

7. The system of claim 4 further comprising a second adjustable locating member coupling said first body to said second body whereby rotation of said adjustable members causes said first body to rotate relative to said second body about a pivot point disposed between said adjustable members.

8. An adjustment system comprising:

a first body having a hole;

a second body having a through-bore;

an adjustable locating member including an adjusting portion located in said hole and a body portion, said adjusting portion revolving eccentrically relative to a center axis of said body portion, and an actuating portion located on said body portion; and a structure having a flat surface abutting against said adjusting portion and a centerline of said adjusting portion being transversely offset from a centerline of said body portion;

whereby actuation of said actuating portion causes said body portion to rotate relative to said adjusting portion thereby moving said first and second bodies with respect to one another.

9. The system of claim 8 wherein said structure includes a segment having longitudinally oriented external formations for engaging with a surface of said first body defining said hole so as to prevent rotational movement of said structure relative to said first body, a pair of legs longitudinally extending from said segment of said structure being separated by a substantially rectangular slot for receiving said adjusting portion, said structure being entirely disposed in said hole.

10. An adjustment system comprising:

a first body having a hole;

a second body having a through-bore;

an adjustable locating member including an adjusting portion located in said hole and a body portion, said adjusting portion revolving eccentrically relative to a center axis of said body portion, and an actuating portion located on said body portion, actuation of said actuating portion operably causing said body portion to rotate relative to said adjusting portion thereby moving said first and second bodies with respect to one another; and at least a pair of threaded fasteners securing said first body to said second body after adjustment of said bodies relative to each other, sections of said threaded fasteners located in second and third through-bores of said second body having diameters smaller than said second and third through-bores thereby providing clearance for allowing rotational adjustment of said first body relative to said second body.

11. The system of claim 10 further comprising a pivot dowel engaging said first body and said second body whereby rotation of said adjustable member causes said first body to pivot about said pivot dowel, wherein said first body is a tool.

12. A tool adjustment system comprising:

a fluid powered gripper having first and second holes;

a mounting member having first and second bores;

a first dowel disposed in said first hole and said first bore; and a second dowel disposed in said second hole and said second bore, a distal end of said second dowel being rotatably affixed to said gripper, a proximal end of said second dowel being allowed to rotate relative to said mounting member during gripper adjustment;

whereby rotation of at least said second dowel causes said gripper to rotate relative to said mounting member.

13. The system of claim 12 wherein said second dowel is rotatably affixed to said mounting member after adjustment to deter further rotation of said gripper relative to said mounting member.

14. The system of claim 12 wherein said first dowel acts as a pivot for said gripper relative to said mounting member during rotation of said second dowel.

15. The system of claim 12 wherein said first and second dowels are substantially identical whereby rotation of said dowels causes said gripper to rotate relative to said mounting member about a pivot point located between said dowels.

16. The system of claim 12 wherein said dowels have substantially smooth and unthreaded surfaces disposed in said holes and said bores.

17. The system of claim 12 wherein said distal and proximal ends of said second dowel are eccentric.

18. The system of claim 17 further comprising an adjustment tool receiving head depending from said proximal end of said second dowel opposite said distal end, and at least a pair of flats located on a peripheral surface of said head.

19. An adjustable dowel assembly comprising:

an insert having an exterior surface with an antirotating feature, a structure projecting from a body of said insert;

a dowel having a substantially smooth, circular-cylindrical segment and a pin being transversely offset from a longitudinal centerline of said segment; and a plug located in said dowel for causing portions of said segment to transversely expand;

wherein said pin abuts against said structure of said insert, whereby rotation of said dowel serves to concurrently move said insert.

* * * * *

UNITED STATES PATENT AND TRADEMARK OFFICE
CERTIFICATE OF CORRECTION

PATENT NO. : 6,200,059 B1
DATED : March 13, 2001
INVENTOR(S) : Edwin G. Sawdon et al.

Page 1 of 1

It is certified that error appears in the above-identified patent and that said Letters Patent is hereby corrected as shown below:

<u>Title page,</u>
Under U.S. Patent Documents, add -- 5,516,173  5/14/96  Sawdon --.

Signed and Sealed this

Sixth Day of November, 2001

Attest:

*Attesting Officer*

NICHOLAS P. GODICI
*Acting Director of the United States Patent and Trademark Office*